(12) United States Patent
Krassinger et al.

(10) Patent No.: US 7,228,729 B1
(45) Date of Patent: Jun. 12, 2007

(54) APPARATUS AND METHOD FOR TESTING FUEL FLOW

(75) Inventors: Eric Daniel Krassinger, Brentwood, MO (US); David Mark Allen, St. Louis, MO (US)

(73) Assignee: Lincoln Industrial Corporation, St. Louis, MO (US)

( * ) Notice: Subject to any disclaimer, the term of this patent is extended or adjusted under 35 U.S.C. 154(b) by 0 days.

(21) Appl. No.: 11/460,062

(22) Filed: Jul. 26, 2006

(51) Int. Cl.
*G01M 15/00* (2006.01)

(52) U.S. Cl. ............................................. 73/118.1
(58) Field of Classification Search ............... 73/46, 73/47, 49.7, 116, 117.2, 117.3, 118.1, 119 A
See application file for complete search history.

(56) References Cited

U.S. PATENT DOCUMENTS

| | | | |
|---|---|---|---|
| 4,381,668 A | | 5/1983 | Sato |
| 4,483,186 A | | 11/1984 | Parel |
| 4,887,577 A | | 12/1989 | Arai |
| 5,020,362 A | * | 6/1991 | Hart et al. ................ 73/119 A |
| 5,284,120 A | * | 2/1994 | Fukushima et al. ......... 123/510 |
| 5,445,018 A | * | 8/1995 | Harpster .................... 73/118.2 |
| 5,633,457 A | | 5/1997 | Kilar |
| 6,457,353 B1 | | 10/2002 | Kanke |
| 6,513,371 B1 | | 2/2003 | Jett |
| 6,672,147 B1 | | 1/2004 | Mazet |
| 6,675,641 B2 | | 1/2004 | Gehner |
| 6,679,230 B2 | | 1/2004 | Kanai |
| 6,769,419 B2 | | 8/2004 | Kanai |
| 6,796,173 B1 | * | 9/2004 | Lajoie et al. ................ 73/261 |
| 6,966,218 B2 | | 11/2005 | Oki |
| 6,971,375 B2 | | 12/2005 | Amano |
| 2002/0078739 A1 | * | 6/2002 | Askew et al. ............. 73/118.1 |
| 2004/0163459 A1 | * | 8/2004 | Christian et al. ............. 73/199 |
| 2005/0034514 A1 | * | 2/2005 | Shen ........................ 73/119 A |
| 2006/0107936 A1 | * | 5/2006 | Mazet ........................ 123/672 |

* cited by examiner

*Primary Examiner*—Eric S. McCall
(74) *Attorney, Agent, or Firm*—Senniger Powers (57) ABSTRACT

Apparatus for testing fuel flow in a return or returnless fuel system. The apparatus comprises a housing, a primary flow passage in the housing having an inlet for connection to the fuel system for receiving fuel pumped by the fuel pump, and an outlet adapted for connection to the fuel system for flow of fuel to one or more fuel injectors. The apparatus includes a first device for measuring a rate of fuel flow through the primary flow passage, and a second device for measuring a fuel pressure in the primary flow passage. A bypass valve in the primary flow passage is movable between a first position in which the bypass passage is closed and the primary flow passage is open to permit the flow of fuel to the outlet of the primary flow passage and a second position in which the bypass passage is open and the primary flow passage is closed whereby fuel is directed through a bypass passage for transfer to a fuel receptacle. The bypass valve is movable to its first position for testing fuel flow in a return flow system and to its second position for testing fuel flow in a returnless fuel flow system.

17 Claims, 11 Drawing Sheets

APPARATUS AND METHOD FOR TESTING FUEL FLOW

BACKGROUND OF THE INVENTION

This invention relates generally to fuel flow systems for an internal combustion engine, and more particularly to apparatus and method for testing the flow of fuel from the fuel tank to such an engine.

In older conventional fuel systems, fuel is pumped at a relatively high rate (e.g., 0.4–0.5 gpm) from the fuel tank to the engine which uses only a relatively small amount of the fuel, the remaining unused portion being delivered back to the fuel tank for recycling. This type of system is often referred to as a standard return fuel system, since the unused fuel is returned to the fuel tank. One drawback of a "return" system is that the temperature of the fuel rises over time as it cycles past the engine and returns to the tank, and the increase in temperature leads to the evaporation of greater amounts of fuel into the atmosphere.

In more recent fuel systems, fuel is pumped at a much lower rate (e.g., 0.05–0.1 gpm) corresponding to the actual need of the engine. All of the fuel pumped to the engine is used; none is returned to the fuel tank. This type of system is known as a "returnless" fuel system.

In testing for proper fuel flow to an engine, it is important to test both the rate of fuel flow and fuel pressure, since testing only one of the conditions is often not sufficient for reliably and accurately diagnosing a problem with the fuel system (e.g., bad fuel pump, faulty pressure regulator, clogged fuel filter, blocked fuel lines, etc.). In a "return" system, the testing for both conditions is relatively easy, since the flow rates are relatively large. However, in a "returnless" system, the flow rate is difficult to measure accurately. This can cause the misdiagnosis of a problem with the fuel system. As a result, costly components, such as fuel pumps, are unnecessarily replaced in a vain attempt to correct a problem arising from a different source.

There is a need, therefore, for an improved apparatus and method for reliably and accurately testing both return and returnless fuel systems.

SUMMARY OF THE INVENTION

In general, apparatus of this invention is used for testing fuel flow in a return or returnless fuel system of the type comprising at least one fuel injector for injecting fuel into the internal combustion engine of a vehicle, and a fuel pump for pumping fuel to at least one fuel injector. The apparatus comprises a housing, a primary flow passage in the housing having an inlet adapted for connection to the fuel system for receiving fuel pumped by the fuel pump, and an outlet adapted for connection to the fuel system for flow of fuel to the at least one fuel injector. The apparatus includes a first device for measuring a rate of fuel flow through the primary flow passage, and a second device for measuring a fuel pressure in the primary flow passage. A bypass passage in the housing has an inlet adapted to communicate with the primary flow passage and an outlet adapted to communicate with a fuel receptacle. The bypass valve in the primary flow passage downstream from the first device is movable between a first position in which the bypass passage is closed and the primary flow passage is open to permit the flow of fuel to the outlet of the primary flow passage and a second position in which the bypass passage is open and the primary flow passage is closed whereby fuel is directed through the bypass passage to the outlet of the bypass passage for transfer to the said fuel receptacle. The bypass valve is movable to the first position for testing fuel flow in a return flow system and to the second position for testing fuel flow in a returnless fuel flow system.

This invention is also directed to a method of using apparatus for testing fuel flow in a return or returnless fuel system of the type comprising a fuel pump and at least one fuel injector. The apparatus comprises a housing, a primary flow passage in the housing, a first device for measuring a rate of fuel flow through the primary flow passage, and a second device for measuring a fuel pressure in the primary flow passage. A bypass passage in the housing has an inlet adapted to communicate with the primary flow passage and an outlet. A bypass valve downstream from the first device is movable between a first position in which the bypass passage is closed and the primary flow passage is open to permit the flow of fuel to an outlet of the primary flow passage and a second position in which the bypass passage is open and the primary flow passage is closed whereby fuel is directed through the bypass passage to the outlet of the bypass passage. The method comprises the steps of connecting an inlet of the primary flow passage to the return or returnless fuel system for receiving fuel pumped by the fuel pump, connecting the outlet of the primary fuel flow passage to the return or returnless fuel system for flow of fuel to the at least one fuel injector, and selectively moving the bypass valve in the primary fuel flow passage either to its first position for testing fuel flow in a return fuel system or to its second position for testing fuel flow in a returnless fuel system.

Other objects and features will be in part apparent and in part pointed out hereinafter.

BRIEF DESCRIPTION OF THE DRAWINGS

Corresponding parts are designated by corresponding reference numbers throughout the several views of the drawing.

DETAILED DESCRIPTION

Figure 1:
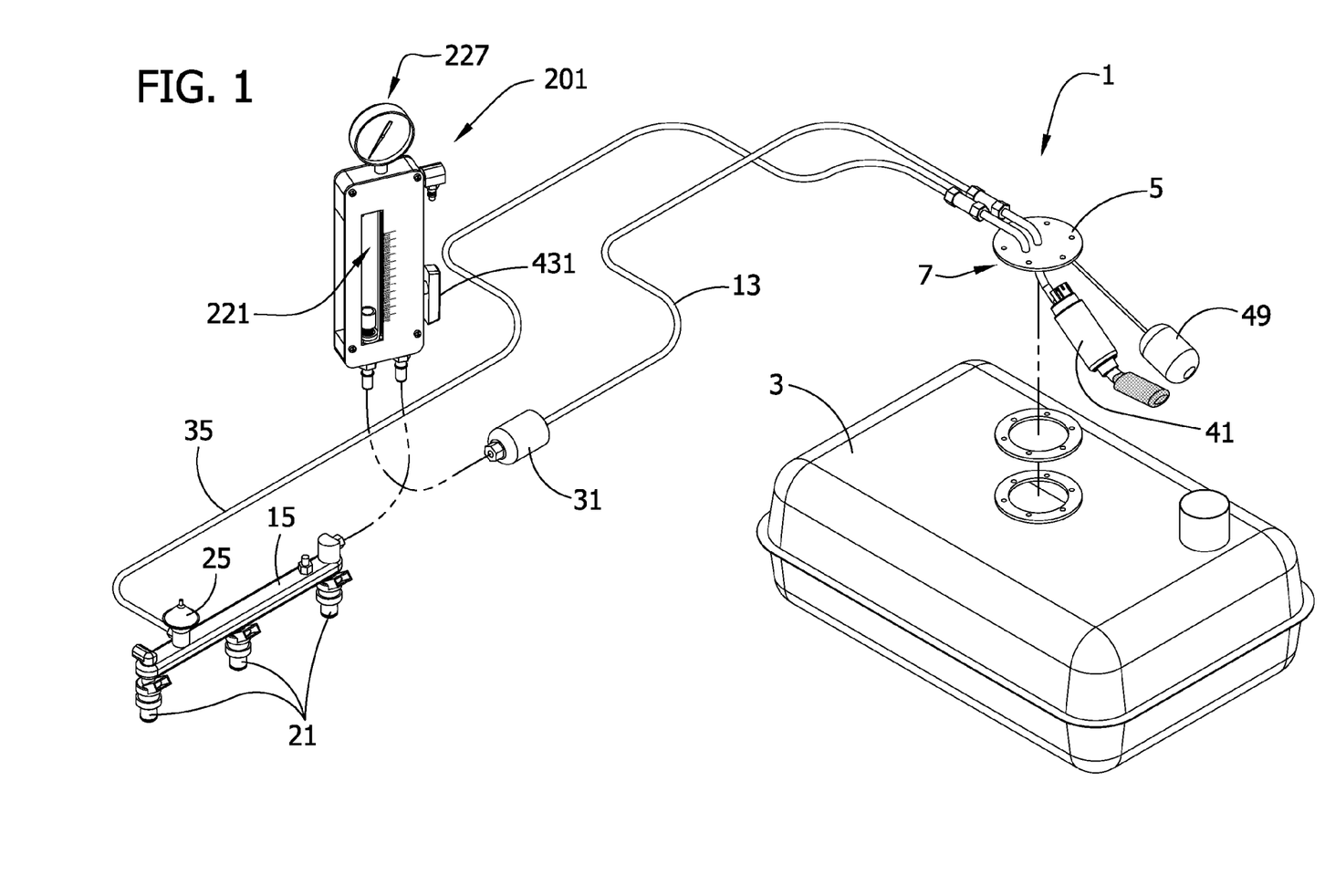
FIG. 1 is a schematic view of a standard prior art return fuel system.

FIG. 1 is a schematic view showing various components of a standard "return" fuel system, generally designated 1.

The system 1 includes a fuel tank 3 and cap 5, a fuel pump assembly 7 mounted on the cap for pumping fuel from the tank 3 through a feed line 13 to one or more fuel rails 15 each comprising a series of fuel injectors 21, a fuel pressure regulator 25 on each fuel rail, a fuel filter 31 in the feed line 13, and a return fuel line 35 for the return of unused fuel to the fuel tank 3. The fuel pump assembly 7 includes, among other things, a fuel pump 41, a fuel filter 31 upstream of the fuel pump and a fuel level sensor 49.

Figure 2:
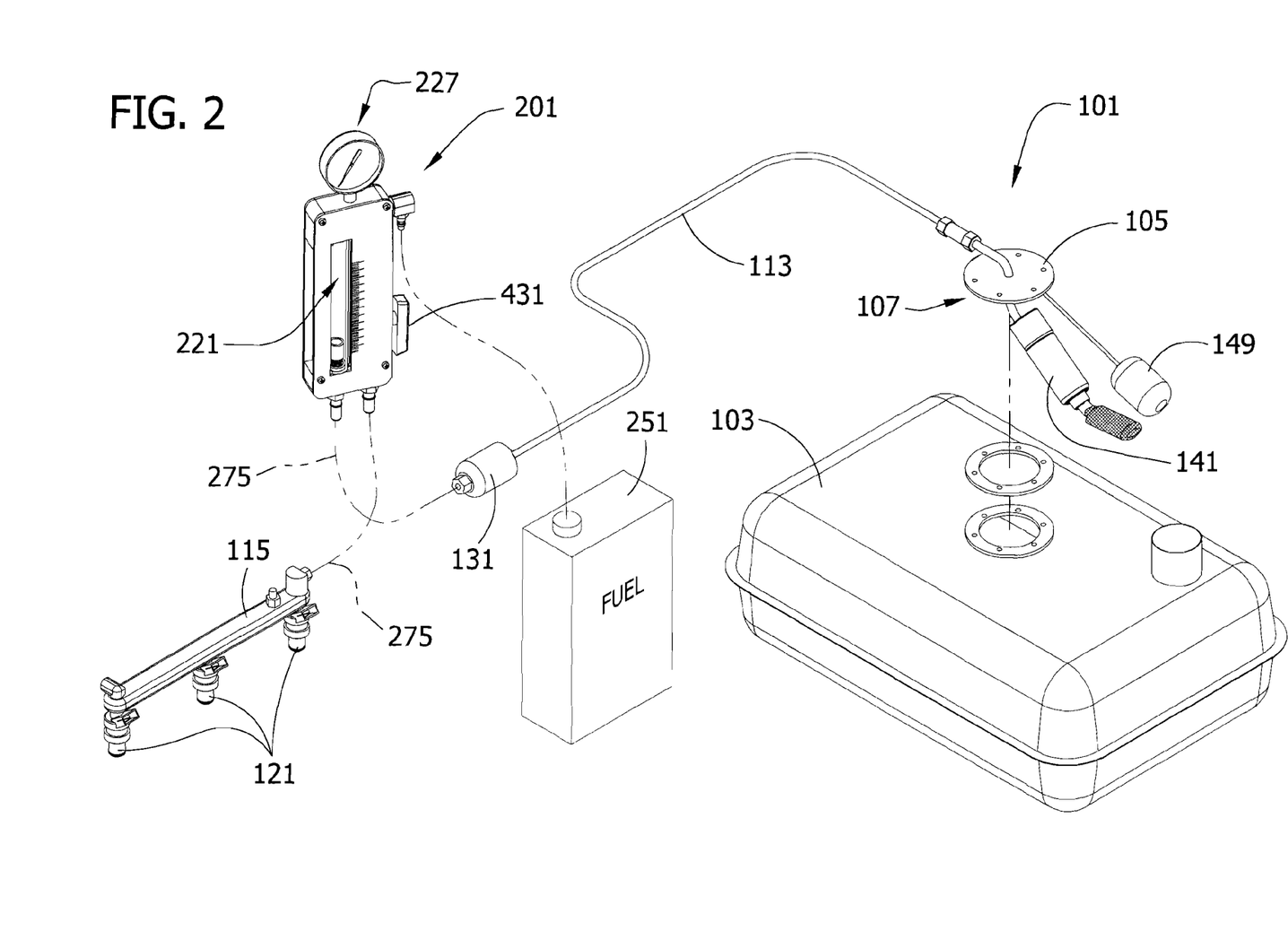
FIG. 2 is a schematic view of a prior art returnless fuel system.

FIG. 2 is a schematic view showing various components of a "returnless" fuel system, generally designated 101. The system includes a fuel tank 103, a fuel pump assembly 107 for pumping fuel from the tank 103 through a feed line 113 to one or more fuel rails 115 each comprising a series of fuel injectors 121 and a fuel filter 131 in the feed line 113. The fuel pump assembly 107 includes among other things, a fuel pump 141, a fuel level sensor 149, and a cap 105. Because all fuel pumped to the fuel rail(s) 115 is used, there is no need for a return line to the fuel tank 103.

Referring now to FIGS. 3–6, one embodiment of fuel testing apparatus of the present invention is generally designated 201. As will be described, this apparatus 201 is capable of measuring the fuel flow rate and fuel pressure in the fuel feed line (e.g., 13 in FIG. 1) of a return fuel system and in the fuel feed line (e.g., 113 in FIG. 2) of a returnless fuel system. In use, the apparatus 201 is typically installed at a location between the fuel filter (e.g., 31, 131) and the fuel injectors (e.g., 21, 121), as shown in FIGS. 1 and 2, although other locations are contemplated.

Figure 3:
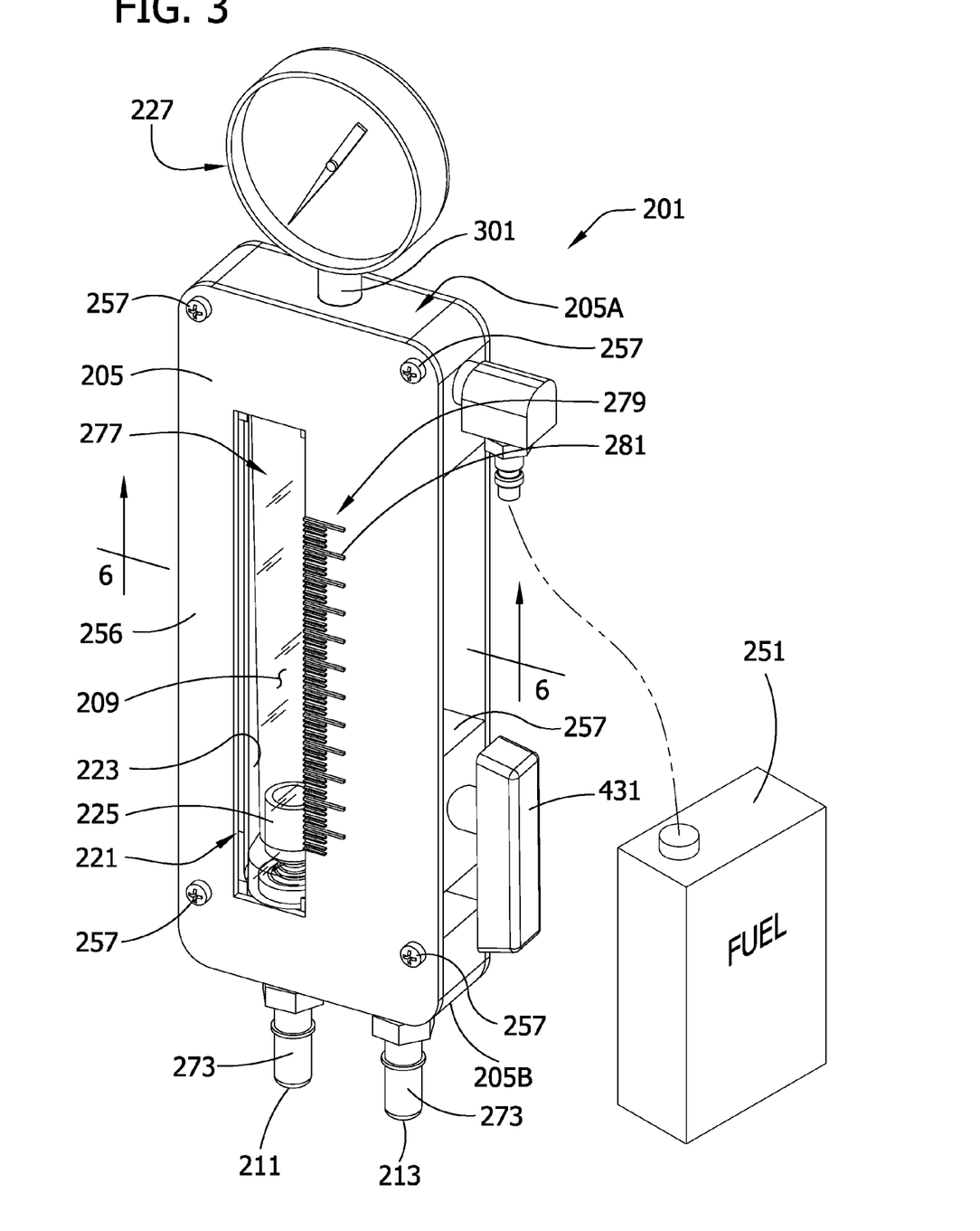
FIG. 3 is a view of one embodiment of fuel testing apparatus of the present invention.
Figure 4:
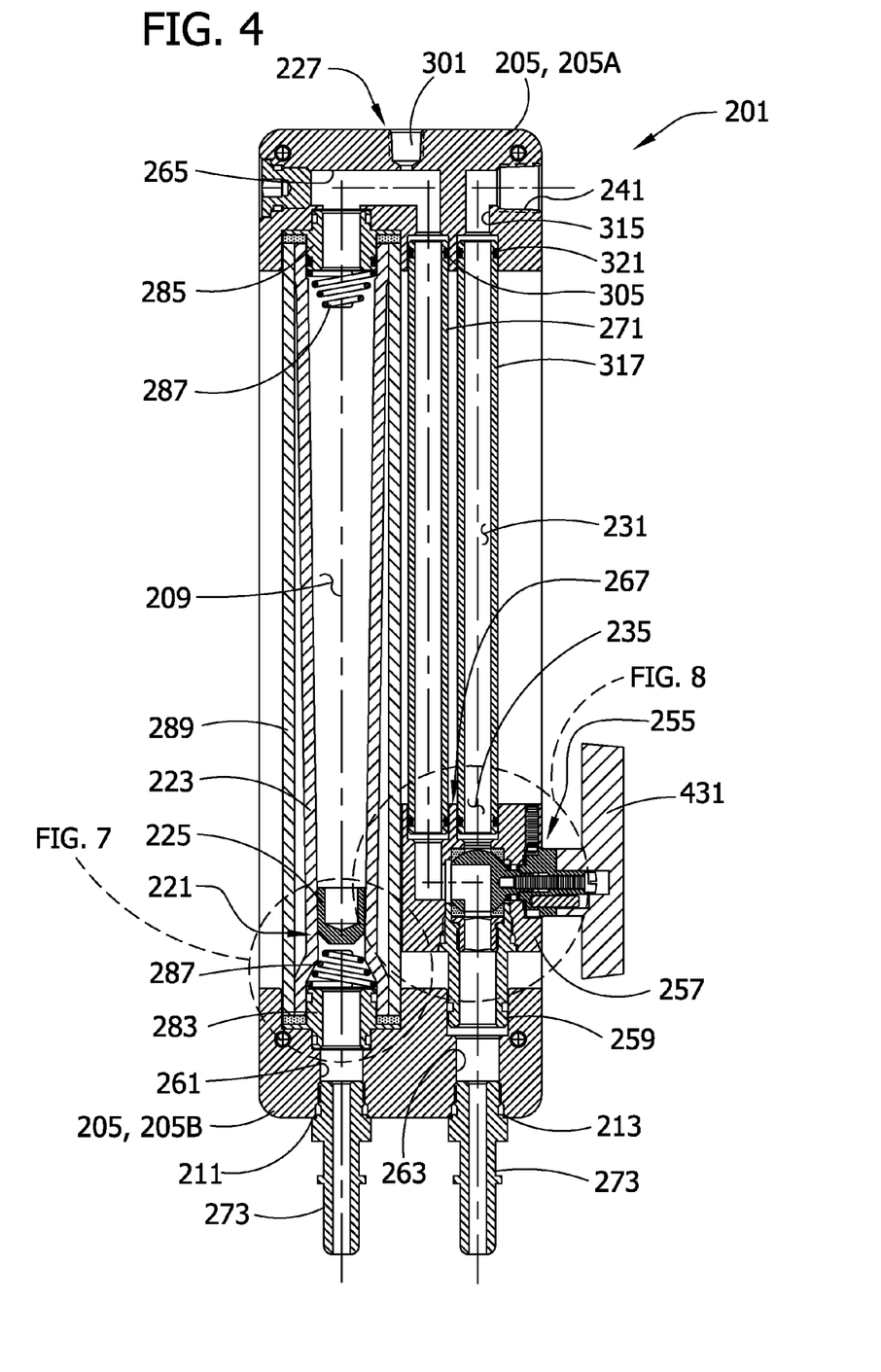
FIG. 4 is an enlarged vertical section of the apparatus of FIG. 3 showing a bypass valve in a first position.
Figure 5:
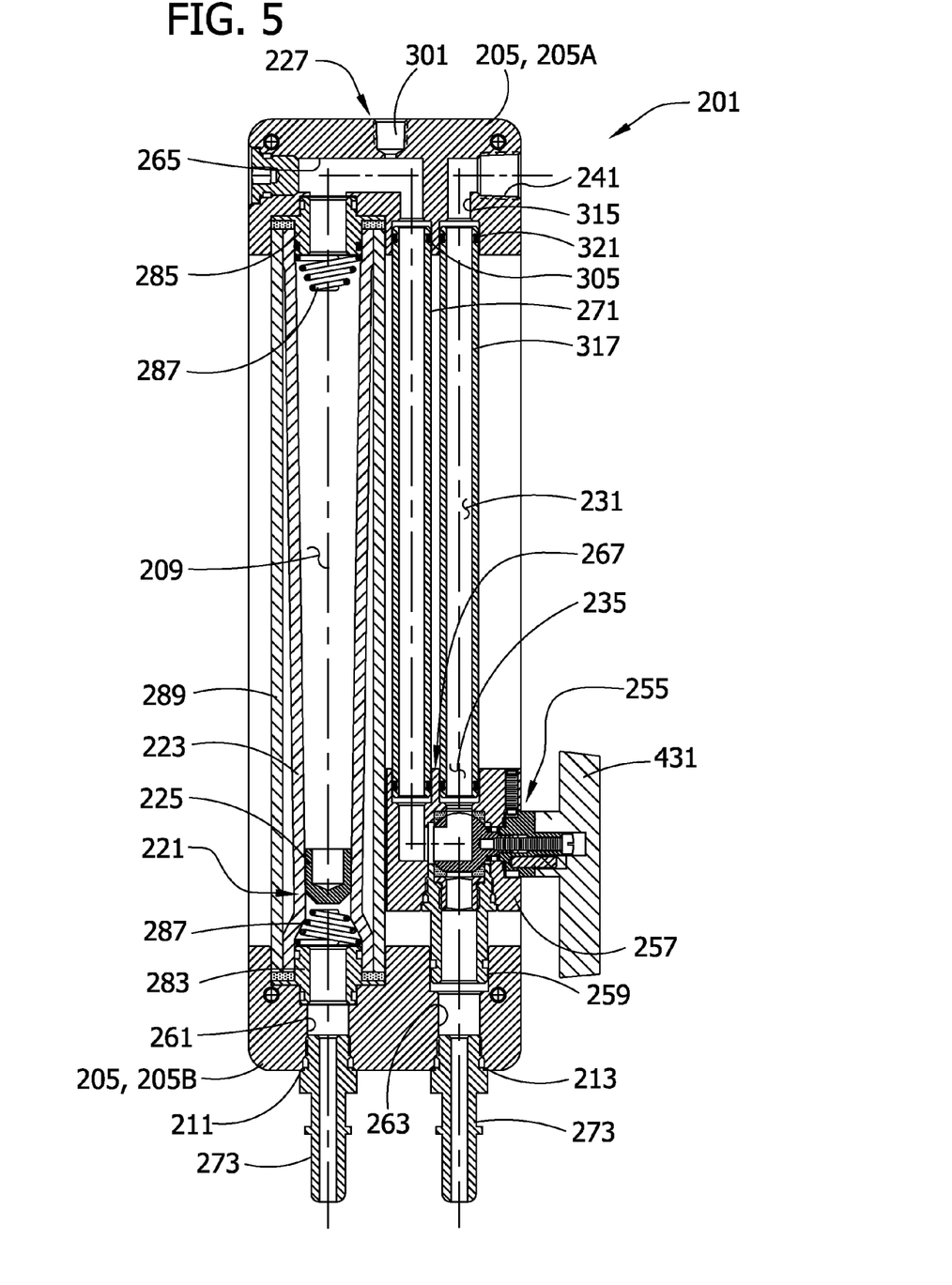
FIG. 5 is a view similar to FIG. 4 but showing the bypass valve in a second position directing fuel into a bypass passage.
Figure 6:
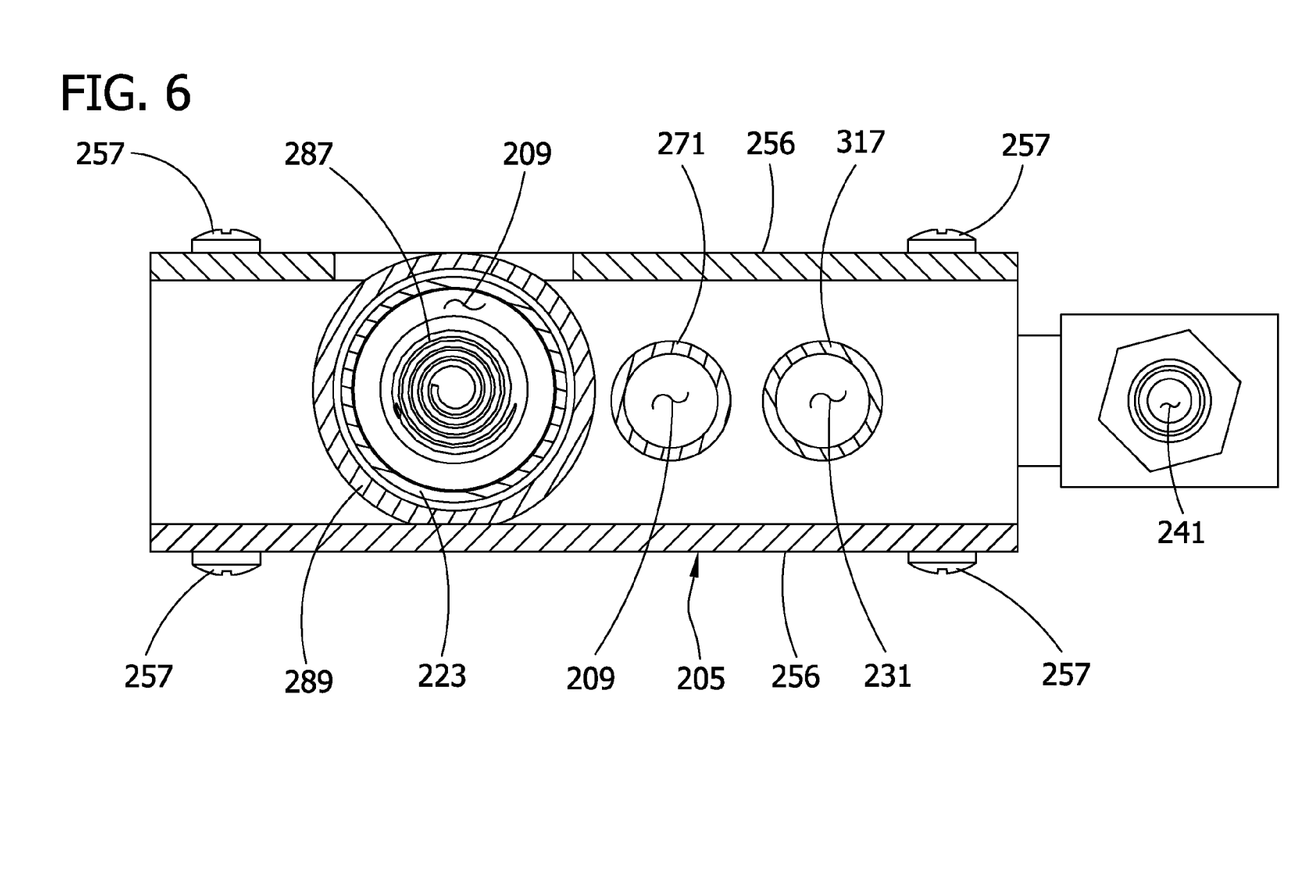
FIG. 6 is an enlarged horizontal section on line 6—6 of FIG. 3.

Referring specifically to FIGS. 3–5, in general, the apparatus 201 comprises a housing generally designated 205, a primary flow passage 209 in the housing having an inlet 211 adapted for connection to a fuel system (e.g., 1, 101) for receiving fuel pumped by the fuel pump (7, 107) of the system, and an outlet 213 adapted for connection to the fuel system for flow of fuel to the at least one fuel injector (e.g., 21, 121). The apparatus 201 also includes, a first device generally indicated at 221 for measuring a rate of fuel flow through the primary flow passage 209, and a second device generally indicated at 227 for measuring fuel pressure in the primary flow passage 209. By way of example, the first device 221 may be a variable area flow meter in the form of a rotameter comprising a tube 223 of varying cross section, and a float 225 in the tube. Also by way of example, the second device 227 may be a pressure gauge for sensing and displaying the pressure of the fuel in the flow passage 209 downstream from the tube 223. A bypass passage 231 is provided in the housing 205. The bypass passage has an inlet 235 which communicates with the primary flow passage 209 and an outlet 241 which is adapted to communicate with a fuel receptacle 251. A bypass valve, generally designated 255, is located in the primary flow passage 209 downstream from the first device 221. This valve 255 is movable between a first position (FIG. 4) in which the bypass passage 231 is closed and the primary flow passage 209 is open to permit the flow of fuel to the outlet 213 of the primary flow passage 209 and a second position (FIG. 5) in which the bypass passage 231 is open and the primary flow passage 209 is closed whereby fuel is directed through the bypass passage 231 to the outlet 241 of the bypass passage 231 for transfer to the aforementioned fuel receptacle 251. As will be described in more detail below, the bypass valve 255 is movable to its stated first (FIG. 4) position for testing fuel flow in a return flow system of the type shown, for example, in FIG. 1, and to its stated second (FIG. 5) position for testing fuel flow in a returnless fuel flow system of the type shown, for example, in FIG. 2.

In the embodiment of FIGS. 3–5, the housing 205 comprises upper and lower end portions, designated at 205A and 205B, respectively, formed by blocks of suitable material (e.g., metal), a pair of parallel face plates 256 secured (e.g., by fasteners 257) to the upper and lower end blocks 205A, B at the front and back of the housing 205, and a valve block 257 mounted between the end blocks 205A, B in the space defined by the face plates 256. The valve block 257 is mounted in position by a tubular member 259 having an upper end connected (e.g., threaded) to the valve block 257 and a lower end connected (e.g., threaded) to the lower end block 205B of the housing 205. The housing 205 can have other configurations without departing from the scope of this invention.

Figure 9:
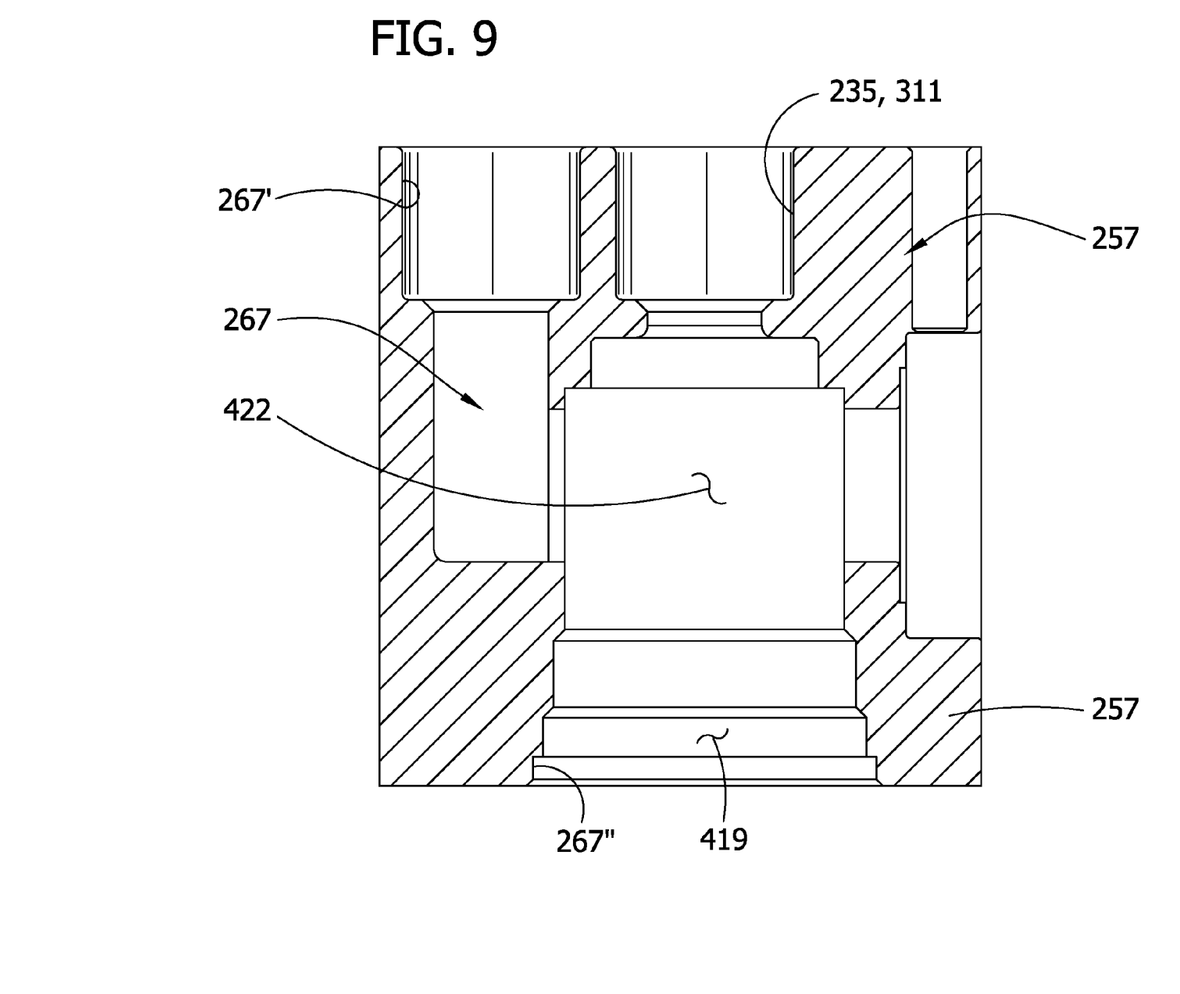
FIG. 9 is an enlarged sectional view of the valve block.

Referring to FIGS. 4 and 5, the primary flow passage 209 in the housing 205 is formed by several discrete passage segments or bores in the housing 205, including an inlet bore 261 extending from the inlet 211 up through the lower end block 205B of the housing 205, an outlet bore 263 extending down through the lower end block 205B of housing to the outlet 213 of the flow passage 209, an intermediate bore 265 in the upper end block 205A of the housing having an inlet end and an outlet end, and a bore 267 in the valve block 257 having an inlet end 267' and an outlet end 267'' (see also FIG. 9). The flow passage 209 is further defined by the variable area flow tube 223 connecting the inlet bore 261 and the inlet end of the intermediate bore 265, a flow tube 271 connecting the outlet end of the intermediate bore 265 and the inlet end 267' of the bore 267 in valve block 257, and the tubular member 259 connecting the outlet end 267'' of the bore 267 in the valve block 257 and the outlet bore 263. The flow passage 209 can have other configurations without departing from the scope of this invention. The inlet and outlet bores 261, 263 of the primary flow passage 209 are connected to the fuel system (1, 101) by connectors 273 fitted in respective bores 261, 263 and projecting out from the lower end block 205B of the housing 205. Each connector 273 has an upper end sealingly threaded into a respective bore, and a lower end configured for attachment to a hose 275 or other component of the fuel system (1, 101).

In the embodiment of FIGS. 3–5, the flow tube 223 of variable cross section tapers from a smaller cross sectional dimension adjacent the lower end block 205B of the housing 205 to a larger cross sectional dimension adjacent the upper end block 205A of the housing 205. As will be understood by the skilled person; the float 225 in the tube 223 rises and falls according to the rate of fuel flow through the tube 223. A window 277 is provided in the front face plate 256 for viewing the flow tube 223 and float 225 (see FIG. 3). A scale 279 with calibration marks 281 is provided on the front face plate 256 alongside the window 277 to indicate the flow rate in appropriate units of flow (e.g., gpm). The tube 223 is desirably of a transparent material for viewing the position of the float 225 in the tube 223 to permit an accurate reading of the flow rate by using the calibration marks 281, and also for viewing characteristics of the fuel, such as color, aeration and other physical properties indicative of the condition of the fuel and, relatedly, the fuel system (1, 101). Preferably, the tube is made out of a non-plastic material such as glass (e.g., glass borosilicate), since plastic may be adversely affected by certain types of fuel with additives. The variable area tube 223 is secured in place at its lower end by a lower tube retainer 283 threaded into the inlet bore 261 and at its upper end by an upper tube retainer 285 threaded into the intermediate bore 265 (see FIGS. 4 and 5). Movement of the float 225 in the tube 223 is cushioned by tapered coil compression springs 287 seated on the two retainers 283, 285. The flow tube 223 is protected by a surrounding sleeve 289, also preferably of a suitable non-plastic transparent material such as glass (e.g., glass borosilicate). The flow tube 223 and associated mounting arrangement can have other configurations without departing from the scope of this invention.

Figure 7:
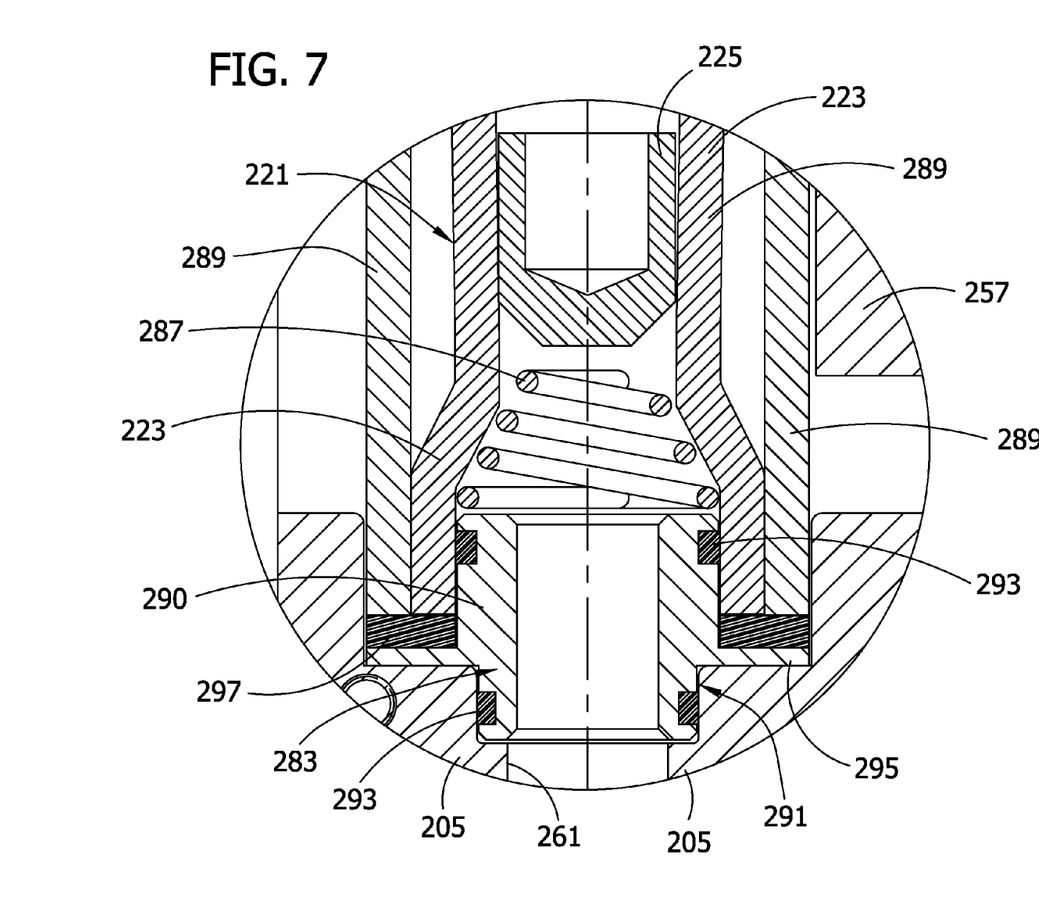
FIG. 7 is an enlarged portion of FIG. 4 showing details of a flow rate measuring device.

As best shown in FIG. 7, each tube retainer 283, 285 comprises a tubular body 290 having an upper end which is received in the lower end of the variable area flow tube 223, and a lower end received in a counter bore 291 at the outlet (upper) end of the inlet bore 261. Seals 293 (e.g., O-rings) are fitted in grooves around the exterior surface of the tubular body 290 for sealing against the inside of the flow tube 223 and the wall of the counter bore 291 to prevent leakage. In addition, the tubular body 290 has a peripheral radial flange 295 for supporting an annular seal 297 which is sealingly engaged by respective ends of the variable area flow tube 223 and its protective sleeve 289.

In the embodiment shown in FIGS. 3–5, the pressure gauge 227 is located for reading the pressure of the fuel in the intermediate bore 265 in the upper end block 205A of the housing 205. The pressure gauge 227 is connected to the housing 205 via a pressure port 301 extending down from the top of the upper end block 205A to the intermediate bore 265. It will be understood that the pressure gauge 227 could be installed at other locations along the primary flow passage 209 without departing from the scope of this invention.

Figure 8:
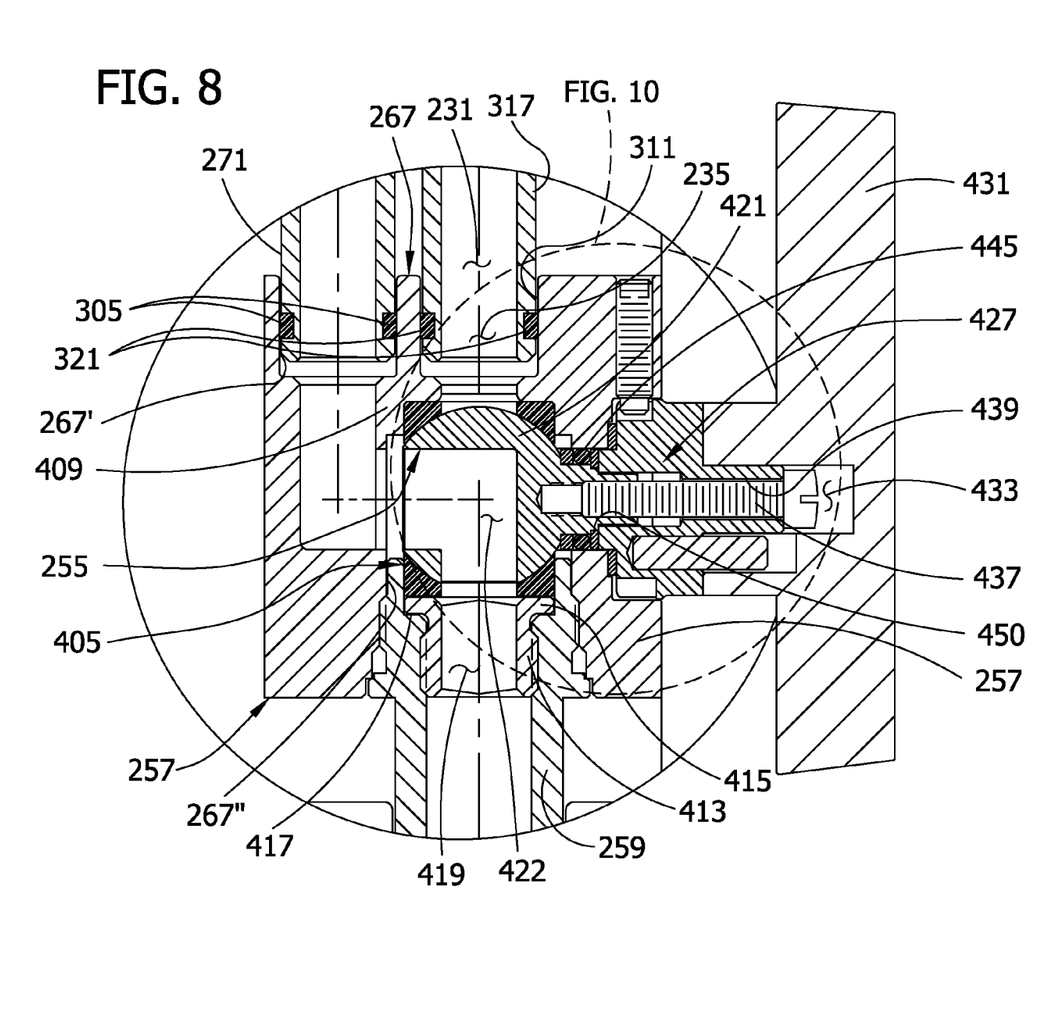
FIG. 8 is an enlarged portion of FIG. 4 showing details of the bypass valve.

Referring to FIGS. 4, 5 and 8, the flow tube 271 connecting the intermediate bore 265 and valve block bore 267 is preferably of uniform cross section, e.g., circular. Seals 305 around the flow tube 271 at its upper and lower ends seal against the walls of respective bores 265, 267 to prevent leakage.

Referring to FIG. 8, the bypass passage 231 in the housing 205 is formed by several discrete passage segments or bores in the housing 205, including a bypass inlet bore 311 in the valve block 257 communicating with the bore 267' (which is part of the primary flow passage 209), a bypass outlet bore 315 in the upper end block 205A of the body of the housing 205 (see FIG. 4), and a bypass flow tube 317 connecting the bypass inlet and outlet bores 311, 315. In the illustrated embodiment, the bypass flow tube 317 is similar to the flow tube 271 of the primary flow passage 209, being of substantially uniform cross section throughout its length and having lower and upper ends received in respective bores 311, 315. Seals 321 provided around the bypass flow tube 317 seal against the wall of bore 311 walls to prevent leakage. In the particular embodiment of FIGS. 4 and 5, the longitudinal axis of the bypass flow tube 317 is vertically aligned with the axis of the bypass outlet bore 315 and the outlet bore 263 of the primary flow passage 209. However, it will be understood that other configurations are possible.

Figure 10:
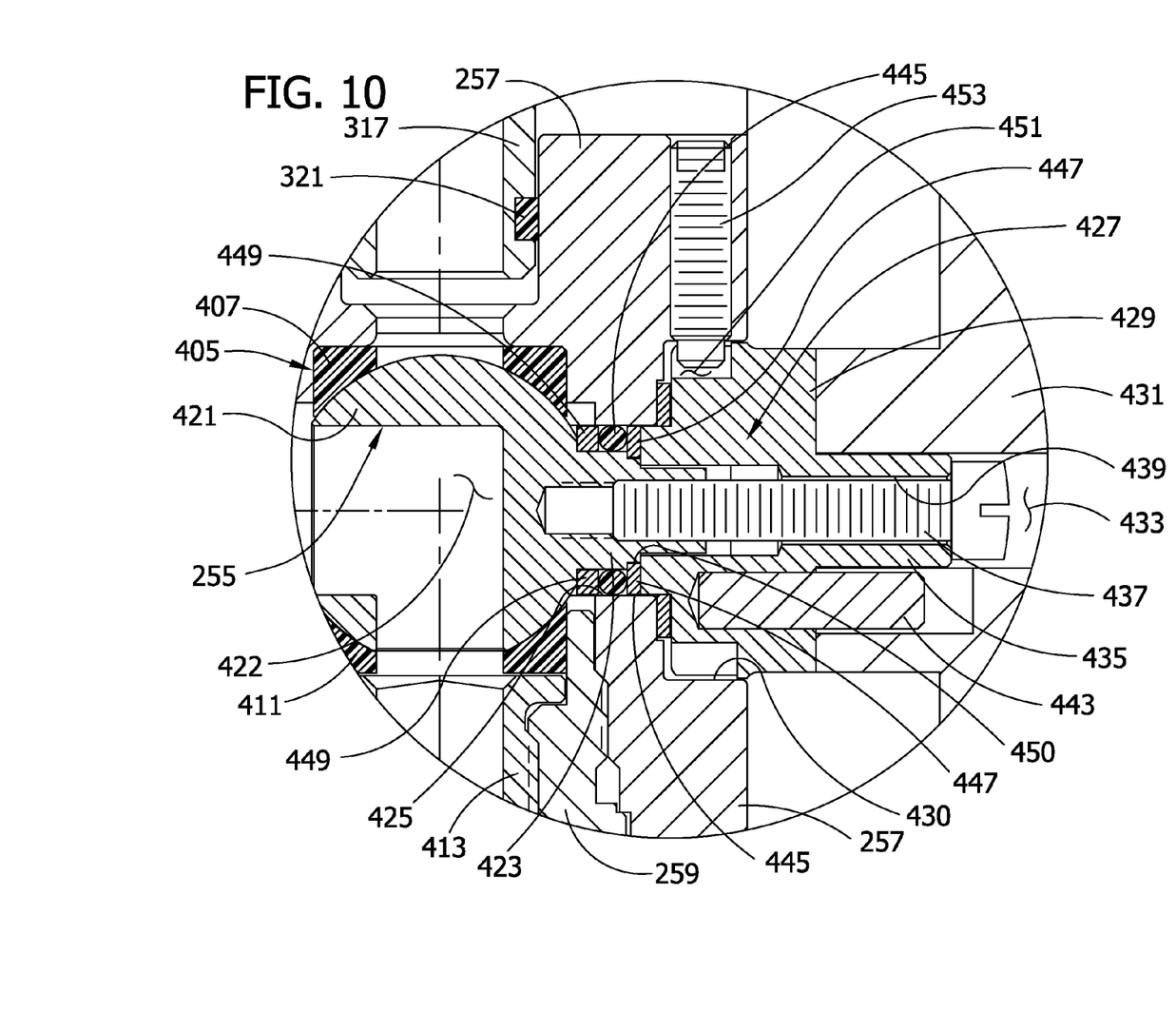
FIG. 10 is an enlarged portion of FIG. 8 showing more detail.

The bypass valve 255 comprises a valve seat, generally designated 405, having opposing parts (upper and lower parts 407, 411 as illustrated in FIG. 10) mounted in the valve block 257. The upper valve seat part 407 is mounted on an internal shoulder 409 in the valve block 257 adjacent the inlet end 267' of the bypass inlet bore 311. The lower valve seat part 411 is supported within the open upper end of the tubular member 259 by a valve seat compression screw 413 threaded in the tubular member 259. The screw 413 comprises an externally threaded generally cylindrical body having a radial flange 415 at its upper end which seats against an internal shoulder 417 in the tubular member 259. The lower valve seat part 411 bears against the upper surface of this radial flange 415. The body of the screw 413 has an internal recess 419 for receiving a tool (e.g., an Allen wrench) to rotate the screw 413 to adjust the spacing between the two parts 407, 411 of the valve seat 405. A movable valve element 421, in this case a spherical ball valve element, is mounted between the valve seat parts 407, 411 for movement between the stated first position (FIG. 4) in which the bypass passage 231 is closed and the primary flow passage 209 is open to permit the flow of fuel to the outlet 213 of the primary flow passage 209 and a second position (FIG. 5) in which the bypass passage 231 is open and the primary flow passage 209 is closed whereby fuel is directed through the bypass passage 231 to the outlet 241 of the bypass passage 231 for transfer to the fuel receptacle 251. In particular, the ball valve element 421 has an L-shaped flow passage 422 therein. When the valve 255 is in its stated first position, the valve flow passage 422 connects the inlet end 267' of the valve bore 267 and the outlet end 267" of the valve bore 267, and the bypass inlet 235 is closed by the ball valve element 421. When the valve 255 is rotated to its stated second position, the ball valve flow passage 422 connects the inlet end 267' of the valve bore 267 and the inlet 235 of the bypass flow passage 231, and the outlet end 267" of the valve bore 267 is closed by the ball valve element 421. The ball valve element 421 is in sealing contact with the opposing valve seat parts 407, 411 to prevent undesired leakage. The compressive force exerted by valve seat parts 407, 411 on the ball valve element 421 can be adjusted by rotating the compression screw 413 one way or another to vary the spacing between the valve seat parts.

Referring again to FIGS. 8 and 9, the ball valve element 421 comprises a ball shaft 423 extending into a bore 425 in the valve housing 257, and a valve handle assembly 427 secured to the ball shaft 423 for rotating the ball valve element 421 between its stated first and second positions. The valve handle assembly 427 includes a valve handle adaptor 429 rotatable in a counter bore 430 formed at one end of the bore 425 in the valve housing 257, a valve handle 431 having a central cavity 433 for receiving an extension or neck 435 of the adapter 429, and a threaded fastener 437 extending through a clearance bore 439 in the adapter 429 and extension 435 for threaded engagement with the ball shaft 423 of the ball valve element 421. The adapter extension 435 and cavity 433 in the valve handle 431 are sized for a close fit, and relative rotation between the two parts is prevented by a dowel pin 443. The valve handle 431 may be removed from the extension 435 to allow access to the screw 437, which may be unthreaded from the ball shaft 423 to permit removal of the valve handle assembly 427 from the valve housing 257. An O-ring 445 seals the gap between the ball shaft 423 and the surrounding bore 425, and a pair of ball shaft spacers 447, 449 is provided on opposite sides of the seal 445 to maintain the ball shaft 423 properly centered in the bore 425. The back spacer 447 (farthest from the ball valve element 421) seats against an external shoulder 450 on the ball shaft 423 to maintain the proper spacing between the valve handle adaptor 429 and the ball valve element 421.

The valve handle adapter 429 has an arcuate groove 451 in its outer surface extending part-way around the circumference of the adapter 429. This groove 451 receives the lower end of a valve stop 453, e.g., a set screw threaded in a bore in the valve body 257. The arcuate length and location of the groove 451 is such that rotation of the valve handle 431 and adapter 429 in one direction is limited by contact of the set screw 453 with one end of the groove 451 at a first rotary location corresponding to the stated first position of the ball valve element 421, and rotation of the valve handle 431 and adapter 429 in the opposite direction is limited by the contact of the set screw 453 with the other end of the groove 451 at a second rotary location corresponding to the stated second position of the ball valve element 421. Other mechanisms may be used for rotating the ball valve element 421 between its stated first and second positions. Further, other types of valve elements may be used without departing from the scope of this invention.

Figure 11:
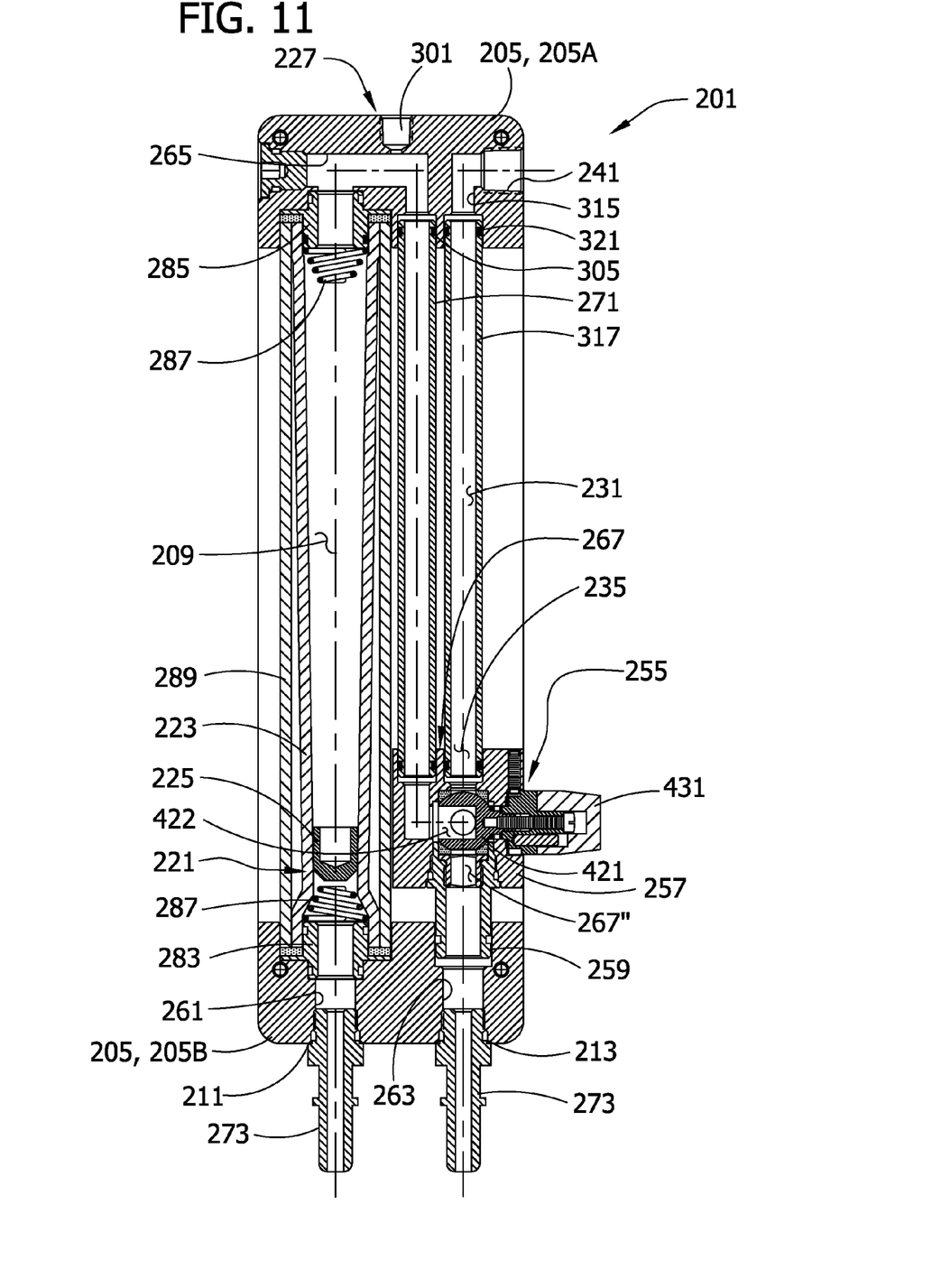
FIG. 11 is a view similar to FIGS. 4 and 5 but showing the bypass valve in a third (closed) position blocking flow of fuel through the valve.

FIG. 11 illustrates a third (closed) position of the bypass valve 255. In this position, the valve flow passage 422 in the ball valve element 421 is out of alignment with the bypass flow passage 235 and the outlet end 267" of the valve bore. As a result, all flow through the valve 255 is blocked. The bypass valve 255 can be used in its third (closed) position to "dead-head" the fuel pump 7, 107 in both return and returnless systems to determine the maximum pumping pressure of the pump. The bypass valve 255 should be closed only briefly (e.g., ten seconds or less) when conducting this test to avoid damage to fuel lines, the fuel pump and/or other components of the fuel system. To move the bypass valve 255 to its third (closed) position, the handle 431 is rotated to a position about midway between its stated first (FIG. 4) and second (FIG. 5) positions. Suitable markings (e.g., "open", "closed" and "bypass") can be provided on the housing 205 adjacent the handle for indicating the three positions of the handle corresponding to the three positions of the valve.

The use of the fuel testing apparatus 201 in return and returnless fuel systems will now be described.

To test fuel flow in a return fuel system, the testing apparatus 201 is connected to the system (e.g., system 1 in FIG. 1) at a location between the fuel pump 41 and the fuel injectors 21. This can be done by connecting the inlet and outlet connectors 273 on the housing 205 to appropriate segments of the fuel feed line 13. With the bypass valve 255 in its first position (FIG. 4), the engine is started to initiate fuel flow through the feed line 13 to the apparatus 201, through the apparatus 201, and thence to the fuel injectors 21. As fuel flows through the apparatus 201, the float 225 will move up in the variable area tube 223 to a location corresponding to the rate of fuel flow (see FIG. 3). The flow rate is then determined by reading the scale 279 alongside the tube 223. The fuel pressure is also measured and displayed by the pressure gauge 227. Accordingly, both fuel flow rate and fuel pressure can be readily determined for making an appropriate diagnosis of the operation of the fuel system 1. Visual inspection of the condition of the fuel as it flows through the transparent tube 223 can also be used to assist in this diagnosis, if necessary or desired.

To test fuel flow in a returnless fuel system, the testing apparatus 201 is connected to the system (e.g., system 101 in FIG. 2) at a location between the fuel pump 141 and the fuel injectors 121. This can be done by connecting the inlet and outlet connectors 273 on the housing 205 to appropriate segments of the fuel feed line 113. With the bypass valve 255 initially in its first position, the engine is started to initiate fuel flow through the feed line 113 to the apparatus 201, through the apparatus 201, and thence to the fuel injectors 121. The bypass valve 255 is then moved to its bypass (second) position (FIG. 5) in which fuel is bypassed through the bypass flow line 231 to the fuel receptacle 251 for appropriate disposal. Two things of note occur when the bypass valve 255 is moved to its bypass position. First, fuel pressure is maintained in the primary flow line 209 and fuel feed line 113 downstream from the valve 255. As a result, the engine continues to run for an interval of time (e.g., 10 seconds or more) sufficient to complete the test. Second, the fuel pressure upstream of the valve 255 drops substantially to zero, thereby allowing the pump 141 to pump fuel at its full capacity, whatever that may be. Therefore, because the fuel rate through the testing apparatus 201 is at a much higher rate, the rate of fuel flow can be measured accurately to provide a proper diagnosis of the operation of the fuel system 101. For example, a measured fuel flow rate corresponding to the rated capacity of the pump 141 will indicate that the fuel pump 141 is functioning properly. Conversely, a measured flow rate substantially less than the rated capacity of the pump 141 is an indication of a malfunctioning fuel pump 141.

The maximum pressure output of the fuel pump 7, 107 in either a return or returnless fuel system can be determined by conducting a "dead-head" test. This test is carried out while the engine is running by moving the bypass valve 255 to its third (closed) position blocking the primary flow passage and bypass flow passage, so that there is no output from the tester 201. After the bypass valve 255 is closed, the fuel pressure upstream of the valve will rise to the maximum output pressure of the fuel pump, and this output pressure can be read using the pressure gage 227. As noted previously, this test should be conducted for only a short period of time to avoid damage to the fuel system.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products and methods without departing from the scope of the invention, it is intended that all matter contained in the above description and shown in the accompanying drawing shall be interpreted as illustrative and not in a limiting sense.

What is claimed is:

1. Apparatus for testing fuel flow in a return or returnless fuel system comprising at least one fuel injector for injecting fuel into the internal combustion engine of a vehicle, and a fuel pump for pumping fuel to the at least one fuel injector, said apparatus comprising
    a housing,
    a primary flow passage in the housing having an inlet adapted for connection to said fuel system for receiving fuel pumped by said fuel pump, and an outlet adapted for connection to said fuel system for flow of fuel to said at least one fuel injector,
    a first device for measuring a rate of fuel flow through said primary flow passage,
    a second device for measuring a fuel pressure in said primary flow passage,
    a bypass passage in the housing having an inlet adapted to communicate with said primary flow passage and an outlet adapted to communicate with a fuel receptacle, and
    a bypass valve in said primary flow passage downstream from said first device and movable between a first position in which the bypass passage is closed and the primary flow passage is open to permit the flow of fuel to the outlet of the primary flow passage and a second position in which the bypass passage is open and the primary flow passage is closed whereby fuel is directed through the bypass passage to the outlet of the bypass passage for transfer to said fuel receptacle, said bypass valve being movable to said first position for testing fuel flow in a return flow system and to said second position for testing fuel flow in a returnless fuel flow system.

2. Apparatus as set forth in claim 1 wherein said bypass valve is located downstream from said second device.

3. Apparatus as set forth in claim 1 wherein said first device comprises a variable area flow meter.

4. Apparatus as set forth in claim 3 wherein said variable area flow meter comprises a rotameter.

5. Apparatus as set forth in claim 4 wherein said second device measures fuel pressure in said primary flow passage at a location downstream from said rotameter.

6. Apparatus as set forth in claim 4 wherein said rotameter comprises a tube of transparent non-plastic material to permit visual inspection of fuel flowing through the tube.

7. Apparatus as set forth in claim 1 wherein said housing has opposite ends, and wherein said inlet and outlet of the primary flow passage are at the same end of the housing and the outlet of the bypass passage is adjacent an opposite end of the housing.

8. Apparatus as set forth in claim 1 wherein said first device bypass valve comprises a ball valve and a valve handle for moving the ball valve between said first and second position.

9. Apparatus as set forth in claim 1 wherein said bypass passage is sized to accommodate full-capacity flow from the fuel pump with no substantial pressure drop between the inlet of the primary fuel flow passage and the outlet of the bypass passage.

10. Apparatus as set forth in claim 1 wherein said bypass valve in said second position is adapted to seal the primary flow passage downstream of the bypass valve.

11. Apparatus as set forth in claim 1 wherein said bypass valve is movable to a third position in which the primary flow passage is closed and the bypass passage is closed.

12. A method of using apparatus for testing fuel flow in a return or returnless fuel system comprising a fuel pump and at least one fuel injector, said apparatus comprising a housing, a primary flow passage in the housing, a first device for measuring a rate of fuel flow through said primary flow passage, a second device for measuring a fuel pressure in said primary flow passage, a bypass passage in the housing having an inlet adapted to communicate with said primary flow passage and an outlet, and a bypass valve downstream from said first device movable between a first position in which the bypass passage is closed and the primary flow passage is open to permit the flow of fuel to an outlet of the primary flow passage and a second position in which the bypass passage is open and the primary flow passage is closed whereby fuel is directed through the bypass passage to the outlet of the bypass passage, said method comprising the steps of:

connecting an inlet of the primary flow passage to said return or returnless fuel system for receiving fuel pumped by said fuel pump, connecting the outlet of said primary fuel flow passage to said return or returnless fuel system for flow of fuel to said at least one fuel injector, selectively moving the bypass valve in said primary fuel flow passage either to said first position for testing fuel flow in a return fuel system or to said second position for testing fuel flow in a returnless fuel system.

13. A method as set forth in claim 12 further comprising the steps of measuring the rate of fuel flow through said primary flow passage and measuring the pressure of said fuel in said primary flow passage when the bypass valve is in said first position and while said engine is running.

14. A method as set forth in claim 12 further comprising the steps of measuring the rate of fuel flow through said primary flow passage but not the pressure of said fuel in said primary flow passage when the bypass valve is in said second position and while the engine is running.

15. A method as set forth in claim 12 further comprising visually inspecting said fuel as it flows through said primary flow passage.

16. A method as set forth in claim 12 wherein fuel pressure downstream of said bypass valve is maintained when the bypass valve is in said second position to permit continued operation of the engine for an interval of time.

17. A method as set forth in claim 12 further comprising selectively moving the bypass valve to a third position while the engine is running, said bypass valve in said third position blocking flow through said primary flow passage and through said bypass flow passage.

* * * * *